United States Patent
Wong et al.

(10) Patent No.: US 12,282,453 B2
(45) Date of Patent: Apr. 22, 2025

(54) OPTIMAL CLUSTER SELECTION IN HIERARCHICAL CLUSTERING OF FILES

(71) Applicant: EMC IP Holding Company LLC, Hopkinton, MA (US)

(72) Inventors: Tony Tzeming Wong, Milpitas, CA (US); Smriti Thakkar, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 356 days.

(21) Appl. No.: 17/405,272

(22) Filed: Aug. 18, 2021

(65) Prior Publication Data

US 2023/0057692 A1 Feb. 23, 2023

(51) Int. Cl.
*G06F 16/11* (2019.01)
*G06F 16/13* (2019.01)
*G06F 16/906* (2019.01)

(52) U.S. Cl.
CPC .......... *G06F 16/122* (2019.01); *G06F 16/137* (2019.01)

(58) Field of Classification Search
None
See application file for complete search history.

(56) References Cited

U.S. PATENT DOCUMENTS

| | | | | |
|---|---|---|---|---|
| 7,139,675 B2* | 11/2006 | Banks | | G06Q 30/02 |
| | | | | 702/181 |
| 10,956,484 B1* | 3/2021 | Kulkarni | | G10L 15/10 |
| 2014/0114933 A1* | 4/2014 | Chandrasekarasastry | | |
| | | | | G06F 3/06 |
| | | | | 711/165 |
| 2020/0043022 A1* | 2/2020 | Karmakar | | G06F 16/322 |
| 2020/0082013 A1* | 3/2020 | Triplet | | G06N 5/022 |
| 2021/0357679 A1* | 11/2021 | Bondugula | | G06N 3/082 |

OTHER PUBLICATIONS

Zhou et al., Method for Determining the Optimal Number of Clusters Based on Agglomerative Hierarchical Clustering, 2017 (Year: 2017).*
Hu et al., Threshold-Based Hierarchical Clustering for Person Re-Identification, Apr. 2021 (Year: 2021).*

* cited by examiner

*Primary Examiner* — Neveen Abel Jalil
*Assistant Examiner* — John J Morris
(74) *Attorney, Agent, or Firm* — Dergosits & Noah LLP; Todd A. Noah

(57) ABSTRACT

A system partitions files, including segments identified by fingerprints. into clusters. The system counts common fingerprints by counting fingerprints which correspond to both a file cluster and another file cluster. The system counts unique fingerprints by counting fingerprints which correspond to the file cluster and/or the other file cluster. The system uses the common and unique fingerprint counts to approximate the distance between the file cluster and the other file cluster. The system identifies the smallest of distances which are approximated between all file clusters. The system merges the file cluster and the other file cluster into a merged file cluster if the approximated distance is the smallest of distances. The system determines an index corresponding to the smallest and next smallest of distances. The system determines indexes which correspond to merges of all file clusters. The system uses the maximum of indexes to identify the optimal file clustering.

18 Claims, 5 Drawing Sheets

OPTIMAL CLUSTER SELECTION IN HIERARCHICAL CLUSTERING OF FILES

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A data storage system may store a data object on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

Data storage systems include recording media that retain digital information, have evolved towards scalable designs that can grow with customer demand by adding storage and computation as necessary, and generally store redundant information. For example, when creating backup copies of an email system which includes 100 instances of the same 1 Megabyte (MB) file attachment, a data storage system may store all 100 instances of the same 1 MB file attachment, inefficiently using 100 MB of storage space to store the same 1 MB file attachment. Data deduplication can eliminate redundant copies of information, which can improve the utilization of data storage and lower capital expenditure by reducing the total amount of recording media required to meet the capacity needs of data storage. Continuing the previous example, a data deduplication system may store only one instance of the same 1 MB file attachment and store small references to the one stored instance for the 99 subsequent instances.

When being written to a data storage system, a data object or a data file is typically divided into data segments. A data deduplication system can receive and then process the data segments by comparing these received data segments against previously stored data segments, identifying which received data segments are unique, and storing the unique data segments. When a comparison identifies a received data segment as a duplicate of a data segment that has already been stored as unique, a data deduplication system replaces the duplicate data segment with a small reference that points to the stored data segment.

A deduplication file system has use cases for identifying groups of similar files, such as the use cases for capacity balancing, colocation of similar files, and the isolation of files that do not deduplicate well. A typical hierarchical clustering algorithm can identify groups of similar objects. However, such an algorithm generates a hierarchy of N−1 clusters of similar objects based on the similarities between the objects, without identifying which of the generated clusters is the optimal clustering of the objects. A hierarchical clustering algorithm can begin with the given N objects as N clusters, merge the 2 most similar objects to form N−1 clusters of objects, then merge the 2 most similar of the existing N−1 objects to form N−2 clusters of objects, etc. A hierarchical clustering algorithm can iteratively repeat this process to generate N, N−1, N−2, . . . 2, and/cluster of objects at iteration 0, 1, 2, . . . N−2, and N−1.

DETAILED DESCRIPTION

Figure 1:
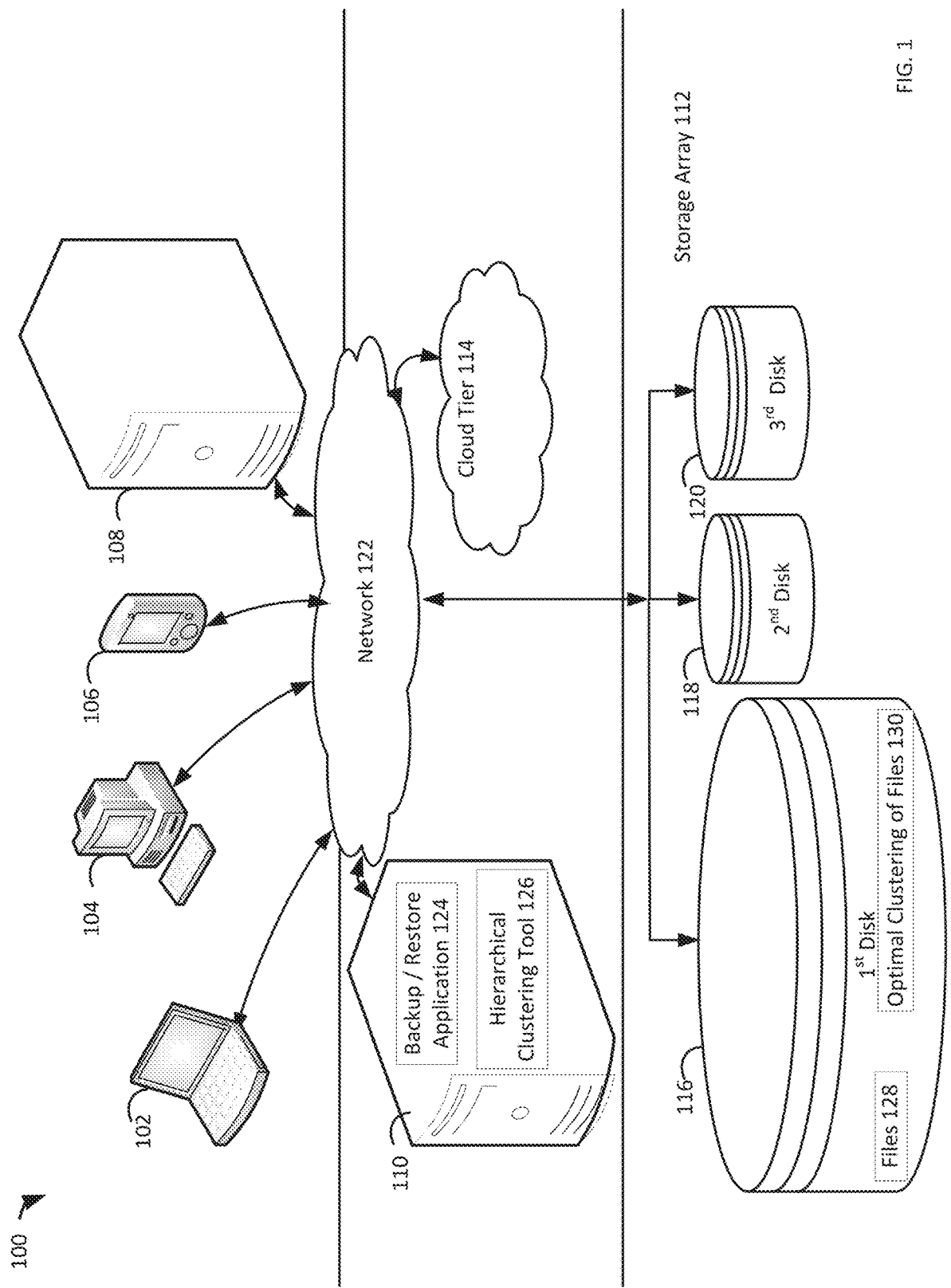
FIG. 1 illustrates a block diagram of an example system for optimized hierarchical clustering of files, under an embodiment.

A hierarchical clustering algorithm may calculate Dunn's index at each iteration, which is calculated as the minimum of the inter-cluster distance divided by the maximum of the intra-cluster distances. Then the hierarchical clustering algorithm can identify the maximum value calculated for Dunn's index, identify the iteration associated with the maximum value for Dunn's index, and identify the clustering of objects at the identified iteration as the optimal clustering of objects, for which the clusters of objects are well-separated, and the sizes of these clusters are compact. A hierarchical clustering algorithm can calculate Dunn's index if the objects are N-dimensional vectors because the distance between any 2 vectors may be defined as the Euclidean space distance, and the distance between any 2 subsets of vectors may be defined as the distance between the two corresponding centroids. A hierarchical clustering algorithm can use some other approximation methods to cluster objects, such as a single linkage method and a complete linkage method.

Since each file in a file system is a collection of segments, using files as vectors is not practical for calculating distances because each segment may include thousands of bits. In a deduplication file system, each segment may be identified by a hash value fingerprint, such that a file may be viewed as a collection of these hash value fingerprints. However, a hierarchical clustering algorithm typically cannot measure distances between such files because the values of fingerprints are randomly generated. For example, two segments that have similar bit distribution patterns may have fingerprints with dissimilar bit distribution patterns, while two segments that have dissimilar bit distribution patterns may have fingerprints with similar bit distribution patterns. Either two hash value fingerprints match or they do not match, and any other attempt to measure their differences will produce random results.

A proxy for the similarity between two files may be defined as the Jaccard coefficient $J(X,Y)=|X \cap Y|/|X \cup Y|$, where $|X \cap Y|$ is the count of unique fingerprints which are common between X and Y and $|X \cup Y|$ is the union count of all unique fingerprints of X and Y. Therefore, a proxy for a distance function may be defined as the compliment of the similarity D (X,Y)=1−J(X,Y). A hierarchical clustering algorithm can apply such a proxy for a distance function to identify groups of similar files.

Embodiments herein enable optimized hierarchical clustering of files. A system partitions files, which include segments identified by fingerprints. into corresponding clusters. The system counts common fingerprints by counting fingerprints which correspond to both a cluster of a file and a cluster of another file. The system counts unique fingerprints by counting fingerprints which correspond to the cluster of the file and/or the cluster of the other file. The system uses the count of common fingerprints and the count of unique fingerprints to approximate a distance between the cluster of the file and the cluster of the other file. The system identifies a smallest of distances which are approximated between every cluster of the files. If the approximated distance is the smallest of the distances, the system merges the cluster of the file and the cluster of the other file into a cluster of the file and the other file. The system determines an index corresponding to a smallest and a next smallest of the distances. The system determines indexes which correspond to merges of all clusters of the files. The system uses a maximum of the indexes to identify an optimal clustering of the files.

For example, an optimized hierarchical clustering tool partitions 50 USA states data files, which include segments that are identified by SHA-1 fingerprints, into 50 clusters. The optimized hierarchical clustering tool counts 99 common SHA-1 fingerprints which both identify segments in the cluster of the Iowa file and identify segments in the cluster of the New Hampshire file. The optimized hierarchical clustering tool counts 1 more SHA-1 fingerprint which identifies only a segment that is in the cluster of the Iowa file but does not identify any segment in the cluster of the New Hampshire file, and counts 1 additional SHA-1 fingerprint which identifies only a segment that is in the cluster of the New Hampshire file but does not identify any segment in the cluster of the Iowa file. Therefore, the optimized hierarchical clustering tool has identified 101 unique SHA-1 fingerprints for the cluster of the Iowa file and the cluster of the New Hampshire file by adding the 1 SHA-1 fingerprint that identifies only a segment that is in the cluster of the Iowa file, the 1 SHA-1 fingerprint that identifies only a segment that is in the cluster of the New Hampshire file, and the 99 SHA-1 fingerprints that identify segments that are in the cluster of the Iowa file and segments that are in the cluster of the New Hampshire file. Based on the 101 unique SHA-1 fingerprints and the 99 common SHA-1 fingerprints, the optimized hierarchical clustering tool approximates a distance of 0.02 between the cluster of the Iowa file and the cluster of the New Hampshire file.

Since the approximated distance of 0.02 between the cluster of the Iowa file and the cluster of the New Hampshire file is the smallest distance between the 50 clusters of the 50 USA states data files, the optimized hierarchical clustering tool merges the cluster of the Iowa file and the cluster of the New Hampshire file into the newly merged cluster of the Iowa file and the New Hampshire file. The optimized hierarchical clustering tool uses the smallest distance of 0.02, between the cluster of the Iowa file and the cluster of the New Hampshire file, and the next smallest distance of 0.03, between the cluster of the New York file and the cluster of the Illinois file, to compute an index of 1.5, which is the distance of 0.03 divided by the distance of 0.02. The optimized hierarchical clustering tool calculates indexes while merging all 50 clusters of USA states data files. The optimized hierarchical clustering tool identifies a maximum index of 1.8 based on the distance of 0.97 between the cluster of the South Dakota file and the cluster of the Nevada file, and the distance of 0.55 between the cluster of the New Hampshire file and the cluster of the Virginia file, such that the clustering of files is optimal after the distance of 0.55 is used to merge the newly merged cluster of the New Hampshire file and the Virginia file.

FIG. 1 illustrates a diagram of a system 100 for optimized hierarchical clustering of files, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108, and a server 110, a storage array 112, and a cloud tier 114 that may be provided by a hosting company. The storage array 112 may include a first disk 116, a second disk 118, and a third disk 120. The clients 102-108, the server 110, the storage array 112, and the cloud tier 114 communicate via a network 122.

Although FIG. 1 depicts the first client 102 as a laptop computer 102, the second client 104 as a personal computer 104, the third client 106 as a smartphone 106, and the fourth client 108 as a server 108, each of the clients 102-108 may be any type of computer. Even though FIG. 1 depicts the system 100 with four clients 102-108, one server 110, one storage array 112, one cloud tier 114, three disks 116-120, and one network 122, the system 100 may include any number of clients 102-108 any number of servers 110, any number of storage arrays 112, any number of cloud tiers 114, any number of disks 116-120, and any number of networks 122. The clients 102-108 and the server 110 may each be substantially like the system 400 depicted in FIG. 4 and described below.

The server 110, which may be referred to as a backup server 110, includes a backup/restore application 124 that can create backup files of data objects for the clients 102-108, and execute a restore based on the backup files stored on the storage array 112 and/or the cloud tier 114. The backup/restore application 124 can provide centralized administration, such as scheduling, monitoring, and managing backup operations and backup files. The backup/restore application 124 can enable the storing of backup operation schedules, client policies, and client configurations. The backup/restore application 124 can provide a unique interface to the clients 102-108 during login and assist the backup server 110 in authenticating and registering the clients 102-108.

The backup/restore application 124 can send backup/restore work orders to the clients 102-108, which can receive and process the work orders to start a backup or restore operation. The backup/restore application 124 can maintain a local database of all processes that execute on the backup server 110. The backup/restore application 124 can execute server-side processes for a system administrator's graphical management console, which may enable the system administrator to use command line interface tools for queries. For example, a system administrator identifies the clients 102-108 registered with the backup server 110.

The backup server 110 also includes a hierarchical clustering tool 126, which can process files, such as files 128 stored on the first disk 116, identify clusters of similar files by generating a hierarchy of clusters of similar files based on approximated distances between the files 128, and then identify which of the clustering of files is the optimal clustering of files 130, which can enable the backup server 110 to store the identified optimal clustering of files 130 on the first disc 116. Although FIG. 1 depicts one hierarchical clustering tool 126 residing completely on the backup server 110 and two sets of files 128 and 130 residing completely on the first disc 116, any number of the hierarchical clustering tool 126 and any number of the sets of files 128 and 130 may reside in any combination of partially or completely on the backup server 110, on another server which is not depicted in FIG. 1, on the cloud tier 114, on the discs 116-120, and on the clients 102-108.

The optimized hierarchical clustering tool 126 can begin with the given N files as N clusters, merge the 2 files with the closest approximate distances to form N−1 clusters of files, then merge the 2 closest of the existing N−1 files to form N−2 clusters of files, etc. The optimized hierarchical clustering tool 126 iteratively repeats this process to generate N, N−1, N−2, . . . 2, and 1 cluster of files at iteration 0, 1, 2, . . . N−2, and N−1. For example, the hierarchical clustering tool 126 selects the files 128 for clustering, which may be 50 USA states data files 128. The hierarchical clustering tool 126 begins with the given 50 USA states data files 128 as 50 clusters, with 1 USA states data file in each of the 50 clusters, merges the 2 USA states data files with the closest approximate distances to form 49 clusters of USA states data files, then merges the 2 closest of the existing 49 cluster of USA states data files to form 48 clusters of USA states data files, etc. The hierarchical clustering tool 126 iteratively repeats this process to generate 50, 49, 48, . . . 2, and 1 cluster of files at clustering iteration 0, 1, 2, . . . 48 and 49.

Figure 2:
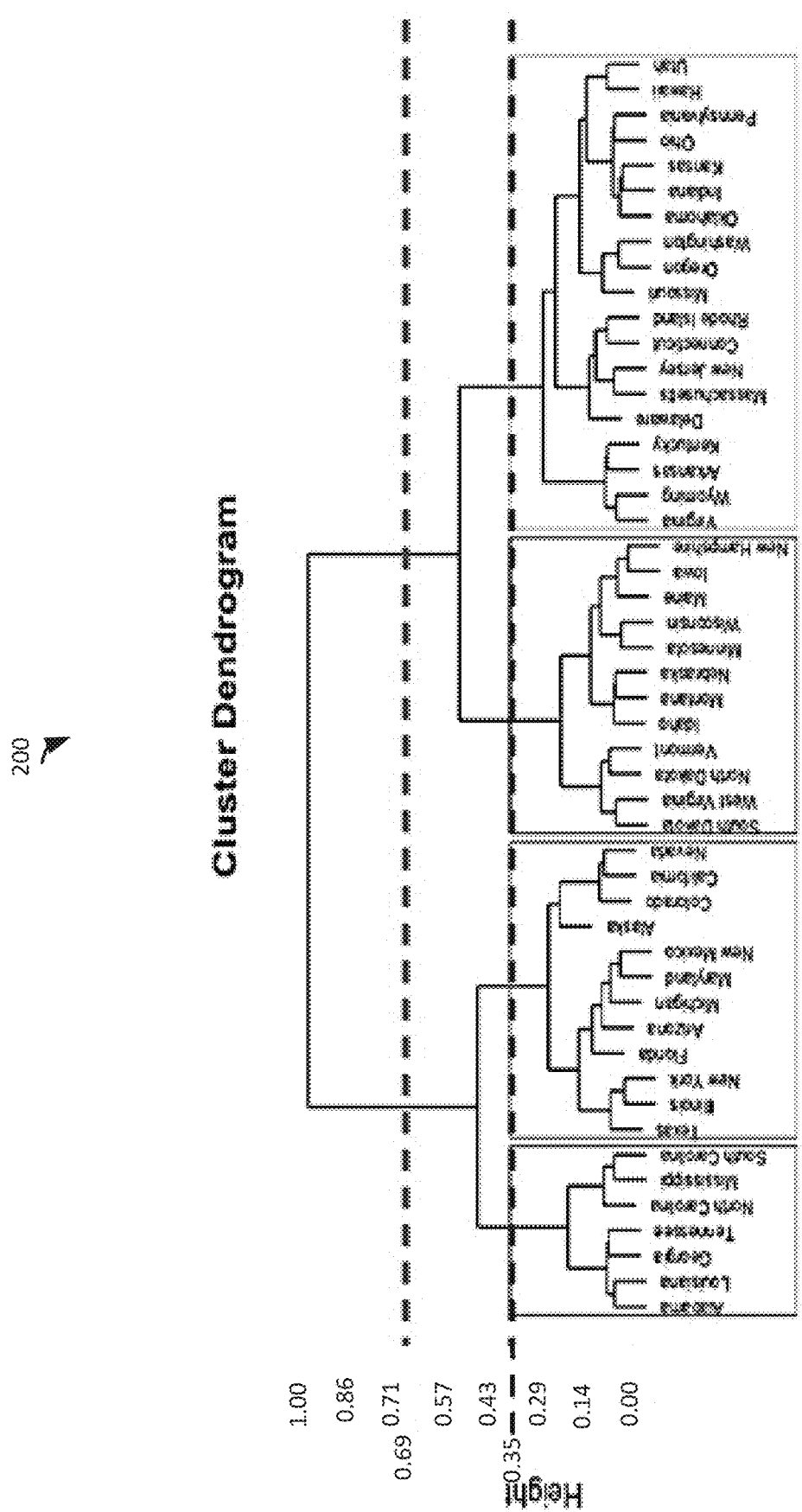
FIG. 2 is a block diagram that illustrates an example graph of optimized hierarchical clustering of files, under an embodiment.

FIG. 2 illustrates a block diagram of an example graph 200 of optimized hierarchical clustering of files, under an embodiment. The graph 200, which may be referred to as a dendrogram 200, is a graphic representation of the hierarchical clustering of 50 USA states data files 128, as described above and below. The x-axis represents the 50 USA states data files 128 and the y-axis represents the distance at which each of the 50 USA states data files 128 are clustered together. The dendrogram 200 depicts that the optimized hierarchical clustering tool 126 merges 2 clusters of files at each iteration.

For example, at the 46$^{th}$ iteration of the optimized hierarchical clustering of the 50 USA states data files 128, there are 4 clusters remaining (50 files−46 iterations=4 clusters), which may be identified in the dendrogram 200 by visually drawing a dashed horizontal line at the height of 0.35. The distance between the cluster which includes the Kentucky file and the cluster which included the Delaware file, which were merged at the 46$^{th}$ clustering iteration is 0.28, which is the largest distance among all the files in this Kentucky-Delaware cluster of 19 USA states data files, such that this distance $D_{46}$=0.28 may be considered the intra-cluster diameter of this Kentucky-Delaware cluster of files at this point of the hierarchical clustering process. The smallest distance between the 4 remaining clusters is 0.46, which is the basis for the optimized hierarchical clustering tool 126 to select the next 2 closest cluster of files, the cluster which includes the South Carolina file and the cluster which includes the Texas file, to merge next, such that the distance $D_{47}$=0.46 may be considered as the initial inter-cluster distance of the 4 remaining clusters.

In another example, at the 47$^{th}$ iteration of the optimized hierarchical clustering of the 50 USA states data files 128, there are 3 clusters remaining (50 files−47 iterations=3 clusters), which may be identified in the dendrogram 200 by visually drawing a horizontal line at the height=0.46, which represents a clustering distance threshold of 0.46 for these 3 remaining clusters. The distance between the cluster which includes the South Carolina file and the cluster which includes the Texas file merged at the 47$^{th}$ clustering iteration is 0.46, which is the largest distance among all the files in the South Carolina file—Texas cluster of 19 USA states data files, such that this distance $D_{47}$=0.46 may be considered the intra-cluster diameter of this South Carolina—Texas cluster of files at this point of the optimized hierarchical clustering process. The smallest distance between the 3 remaining clusters is 0.55, which is the basis for the optimized hierarchical clustering tool 126 to select the next 2 closest cluster of files, the cluster which includes the New Hampshire file and the cluster which includes the Virginia file, to merge next, such that the distance $D_{48}$=0.55 may be considered as the initial inter-cluster distance of the 3 remaining clusters.

In yet another example, at the 48$^{th}$ iteration of the optimized hierarchical clustering of the 50 USA states data files 128, there are 2 clusters remaining (50 files−48 iterations=2 clusters), which may be identified in the dendrogram 200 by visually drawing a horizontal line at the height=0.55, which represents a clustering distance threshold of 0.55 for these 2 remaining clusters. The distance between the cluster which includes the New Hampshire file and the cluster which includes the Virginia file merged at the 48$^{th}$ clustering iteration is 0.55, which is the largest distance among all the files in this New Hampshire—Virginia cluster of 31 USA states data files, such that this distance $D_{48}$=0.55 may be considered the intra-cluster diameter of this New Hampshire—Virginia cluster of files at this point of the optimized hierarchical clustering process. The smallest distance between the 2 remaining clusters is 0.97, which is the basis for the optimized hierarchical clustering tool 126 to select the next 2 closest cluster of files, the cluster which includes the South Dakota file and the cluster which includes the Nevada file, to merge next, such that the distance $D_{49}$=0.97 may be considered as the initial inter-cluster distance of the 2 remaining clusters.

In an additional example, at the 49$^{th}$ iteration of the optimized hierarchical clustering of the 50 USA states data files 128, there is 1 cluster remaining (50 files−49 iterations=1 cluster), which may be identified in the dendrogram 200 by visually drawing a horizontal line at the height=0.97. The distance between the cluster which includes the South Dakota file and the cluster which includes the Nevada file merged at the 49$^{th}$ clustering iteration is 0.97, which is the largest distance among all the files in this South Dakota—Nevada cluster of 50 USA states data files, such that this distance $D_{49}$=0.97 may be considered the intra-cluster diameter of this South Dakota—Nevada cluster of files at this point of the optimized hierarchical clustering process.

An intra-cluster diameter is defined with respect to the files that form a cluster. Since the clusters are formed by first merging the most similar objects, or by proxy the closest files, their corresponding distances are increasing, $D_k \geq D_{k-1} \geq D_{k-2} \ldots \geq D_2 \geq D_1$. $D_k$ is the largest distance among the files that form the cluster at the k-th iteration.

Therefore, $D_k$ represents the intra-cluster diameter. The next closest distance among all the remaining clusters at the k-th iteration is $D_{k+1}$. Therefore, $D_{k+1}$ is the inter-cluster distance at the k-th iteration.

At the k-th iteration, the optimized hierarchical clustering tool 126 has partitioned the N files into N–k clusters of files, with $D_k$ as the distance between the 2 most recently clustered files at iteration k and $D_{k+1}$ as the distance between the next 2 clustered files at iteration k+1. The clustering of files at the iteration k is optimal if all the clusters are well separated, having large inter-cluster distance, and the clusters sizes are compact, having small intra-cluster diameter. Since the distance $D_{k+1}$ represents when all the clusters are well separated, having large inter-cluster distance and the distance $D_k$ represents when the clusters sizes are compact, having small intra-cluster diameter, the optimized hierarchical clustering of files is optimal when the ratio of the distance $D_{k+1}$ to the distance $D_k$ IS maximized. Therefore, a $W_k$ index may be defined as $D_{k+1}/D_k$ (if $D_k$ is zero, the $W_k$-index is undefined), and computed at each iteration of the optimized hierarchical clustering to identify the iteration k when the $W_k$ index is maximized, which is the iteration that optimizes the clustering of files.

For example, the dendrogram 200 depicts that $W_{46}=D_{47}$ (0.46)/$D_{46}$ (0.28)=1.6, $W_{47}=D_{48}$ (0.55)/$D_{47}$ (0.46)=1.2, and $W_{48}=D_{49}$ (0.97)/$D_{48}$ (0.55)=1.8. Based on the $W_k$-index reaching its maximum value of 1.8 when k=48, the dendrogram 200 depicts that the optimal clustering of the 50 USA states data files 128 is the 2 clusters of files that intersect the dashed line at the height of 0.69.

To use a distance function to identify clusters of similar files, the optimized hierarchical clustering tool 126 counts the common fingerprints, which are each fingerprint that represents both a segment in the cluster which includes file X and a segment in the cluster which includes file Y, and counts the unique fingerprints, which are each fingerprint that represents either a segment in the cluster which includes file X, a segment in the cluster which includes file Y, or a segment in the cluster which includes file X and a segment in the cluster which includes file Y. The optimized hierarchical clustering tool 126 can count these fingerprints by sorting all the fingerprints for the clusters which include each file, and then comparing the individual fingerprints in one cluster's sorted list of fingerprints against the individual fingerprints in another cluster's sorted list of fingerprints, and then repeating this fingerprint-by-fingerprint comparison process for every merge of two clusters. In this disclosure's simplified examples, the process of comparing 100 fingerprints for the cluster which includes a file against 100 fingerprints for the cluster which includes another file to approximate the distance between only 2 clusters might not seem completely impossible to be performed in the mind of a human.

However, data deduplication systems typically divide files into segments that are 10 KB in size, such that a 1 GB file is divided into 1 million segments, and each of these 1 million segments is represented by a unique 20-byte SHA-1 fingerprint. Sorting 1 million 20-byte fingerprints for each cluster, and then individually comparing 1 million 20-byte fingerprints for one cluster against 1 million 20-byte fingerprints for another cluster, and then repeating this process for every possible merging of clusters is well beyond the mental capabilities of any human to perform practically, or otherwise. Furthermore, the amount of memory, the CPU utilization, and the number of input/output operations required for a computer system to perform such sorting and comparisons may result in a significantly large consumption of system resources.

The optimized hierarchical clustering tool 126 can reduce the consumption of system resources by its host computer system when performing such counts of fingerprints by generating a specialized array, such as a Bloom filter with a single hash function, for each cluster to be merged. The optimized hierarchical clustering tool 126 can apply a single hash function to each cluster's fingerprints to generate each cluster's hash values, maps each of these hash values to its corresponding bit in each cluster's array, and then stores each cluster's mapped array. When needing to count the common fingerprints and the unique fingerprints for two clusters, the optimized hierarchical clustering tool 126 can use a logical OR operation to merge the mapped arrays for the two clusters, with the number of bits in the merged array equaling the count of unique fingerprints for the two clusters.

The optimized hierarchical clustering tool 126 can add together the number of bits in the two clusters' individual arrays, and then subtracts the number of unique bits set in the merged array to determine the count of common fingerprints for the two clusters. While system resources are required to initialize the arrays for each cluster and count the fingerprints (or bits set) for each cluster, subsequently approximating the distances between any clusters requires only sufficient system resources to merge two arrays and count the bits in the merged arrays. In contrast, the conventional counting of fingerprints for two clusters requires significant system resources to compare every fingerprint for one cluster against every fingerprint for another cluster.

The optimized hierarchical clustering tool 126 can further reduce the consumption of system resources by its host computer system when performing counts of fingerprints by using only a randomly sampled subset of all fingerprints for each cluster. For example, if each 1 GB file is divided into 1 million segments which are identified by 1 million fingerprints, the optimized hierarchical clustering tool 126 can use a sampling rate of 1/1,000 to randomly sample 1 thousand fingerprints for each file, which would still be a sufficiently large sample size of fingerprints to enable approximation of distances between clusters of files. The use of a significantly smaller subset of fingerprints would require significantly less storage space for significantly smaller arrays, and significantly less CPU utilization to merge significantly smaller arrays and count significantly fewer bits in the merged arrays. A detailed description of using Bloom filters to efficiently estimate similarities between objects is discussed in commonly assigned U.S. patent application Ser. No. 17/125,536 filed Dec. 17, 2020, which is hereby incorporated by reference in its entirety and for all purposes.

Although the following paragraphs describe Dell Corporation's PowerProtect® backup/restore application, Dell Corporation's NetWorker® backup/restore application, and Dell Corporation's Avamar® backup/restore application as examples of the backup/restore application 124, the backup/restore application 124 may be any other type of backup/restore application which provides the backup/restore functionalities described in the Background section. The backup server 110 may be any other type of backup server which provides the backup/restore functionalities described in the Background section.

The backup/restore application 124 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 124 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 124 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility.

Periodic checks of data systems ensure recoverability whenever needed. Dell Corporation's Avamar® systems may be deployed in an integrated solution with Dell Corporation's Data Domain® systems for high-speed backup and recovery of specific data types. The storage array 112 may be a Dell Corporation's Powermax, a Dell Corporation XIO, or a Dell Corporation Unity storage array.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk 116 for 6 months, store a primary clone of the backup copies onto the second disk 118 for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering 114 for long term retention. Backup copies stored in the cloud tiering 114 have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can specifies the target storage device where backup copies are stored, such as the first disk 116, the second disk 118, the third disk 120, and/or cloud-tiering 114.

Figure 3A:
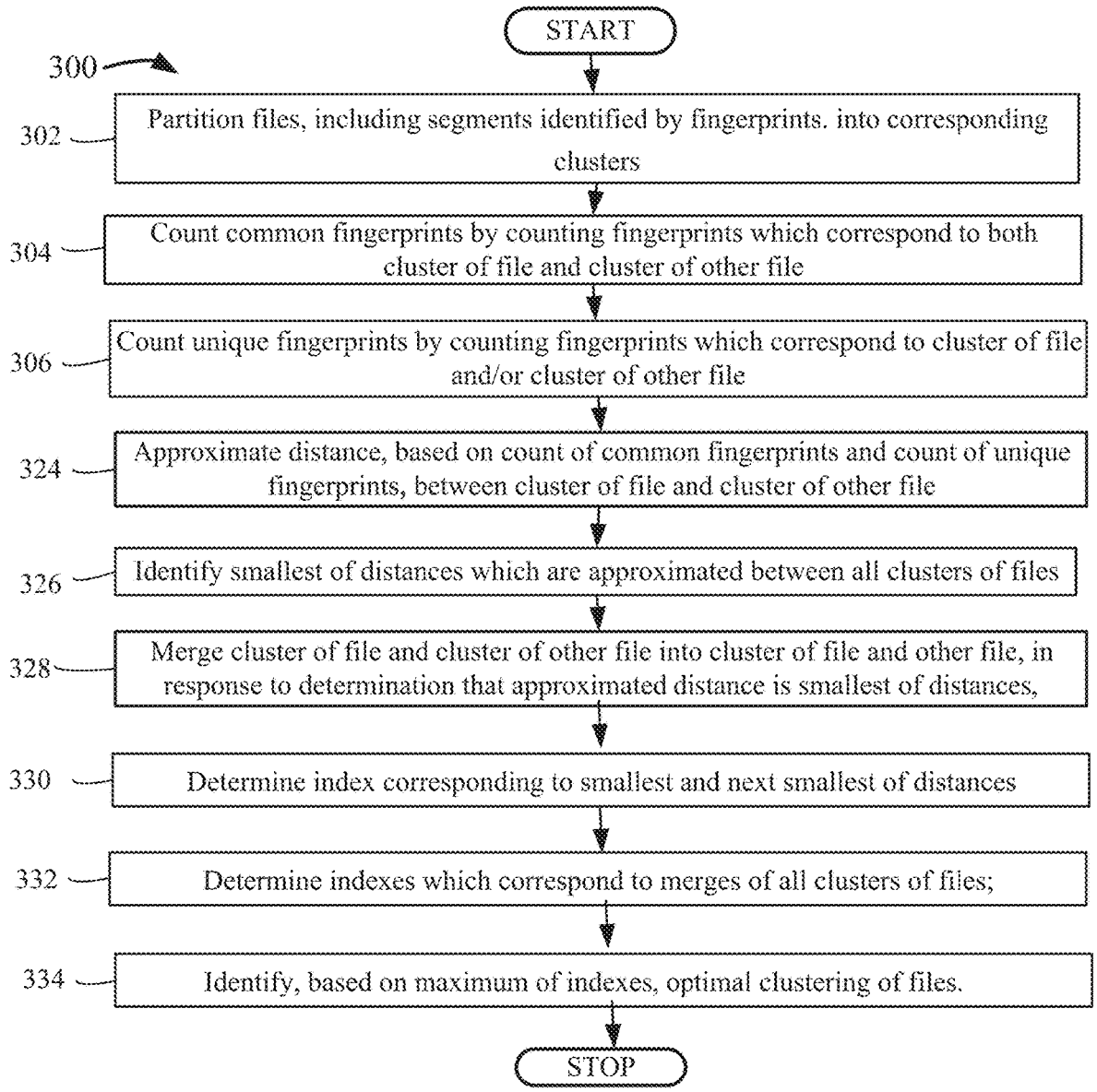
FIG. 3A and FIG. 3B are a flowchart that illustrates a method of optimized hierarchical clustering of files, under an embodiment.
Figure 3B:
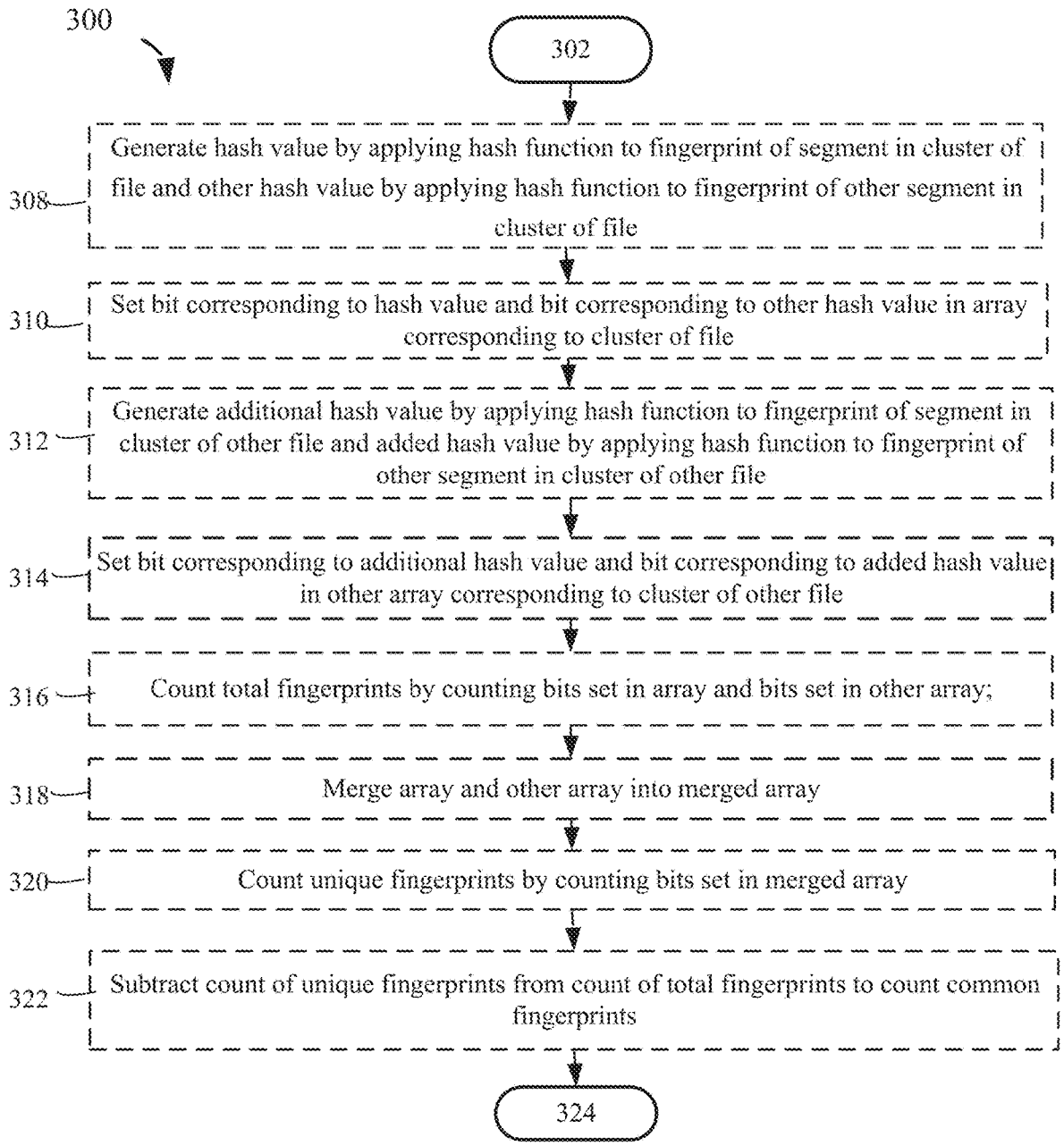

FIG. 3A and FIG. 3B depict a flowchart that illustrates a method for optimized hierarchical clustering of files, under an embodiment. Flowchart 300 illustrates method acts illustrated as flowchart blocks for certain steps involved in the backup server 110, the clients 102-108, the storage array 112, and the cloud tier 114, and/or between the clients 102-108 and the backup server 110, the storage array 112, and the cloud tier 114 of FIG. 1.

Files, comprising segments identified by fingerprints, are partitioned into corresponding clusters, block 302. A system partitions files into individualized clusters which will be merged. For example, and without limitation, this can include the optimized hierarchical clustering tool 126 partitioning 50 USA states data files 128 that include segments which are identified by SHA-1 fingerprints that are unique for each USA states data file, into 50 clusters. Each fingerprint may be generated as a hash value by applying a hash function to a corresponding segment. For example, the backup/restore application 124 uses the SHA-1 (Secure Hash Algorithm 1) cryptographic hash function which takes a segment in the 50 USA states data files 128 as an input and produces a 160-bit (20-byte) hash value known as a message digest— typically rendered as a hexadecimal number, 40 digits long.

A file can be a collection of data stored in a computer's memory or on a storage device which is identified by a single name. A segment can be a portion of data in an object or file. A fingerprint can be a bit string which was mapped from a larger data object or data file, and which identifies the larger data object or data file.

A hash function can be any relation between an input and an output that can be used to map data of arbitrary size to data of fixed size. Examples of hash functions include the Bernstein hash, the Fowler-Noll-Vo hash function, the Jenkins hash function, Pearson hashing, and Zobrist hashing. A hash value can be an output returned by a function, and can also be called a hash code, a hash sum, or a hash.

After partitioning files into clusters, common fingerprints are counted by counting fingerprints which correspond to both a cluster of a file and a cluster of another file, block 304. The system counts fingerprints shared by each pair of clusters to determine the proxy distances between the clusters. By way of example and without limitation, this can include the optimized hierarchical clustering tool 126 counting 99 common SHA-1 fingerprints which both identify segments in the cluster of the Iowa file and identify segments in the cluster of the New Hampshire file. The optimized hierarchical clustering tool 126 can count the 99 common SHA-1 fingerprints by sorting all 100 SHA-1 fingerprints for the cluster of the Iowa file, sorting all 100 SHA-1 fingerprints for the cluster of the New Hampshire file, and then comparing the individual SHA-1 fingerprints in the sorted list of 100 SHA-1 fingerprints for the cluster of the Iowa file against the individual fingerprints in the sorted list of 100 SHA-1 fingerprints for the cluster of the New Hampshire file. Common fingerprints can be bit strings which were mapped from larger data objects or data files, and which can identify multiple larger data objects or data files.

Following the count of fingerprints shared by a cluster of a file and a cluster of another file, unique fingerprints are counted by counting fingerprints which correspond to the cluster of the file and/or the cluster of the other file, block 306. The system counts the unique fingerprints for each pair of clusters to determine the proxy distances between the clusters. In embodiments, this can include the optimized hierarchical clustering tool 126 counting 1 more SHA-1 fingerprint which identifies a segment that is in the cluster of the Iowa file but does not identify any segment in the cluster of the New Hampshire file, and counting 1 additional SHA-1 fingerprint which identifies a segment that is in the cluster of the New Hampshire file but does not identify any segment in the cluster of the Iowa file. Therefore, the optimized hierarchical clustering tool 126 identifies 101 unique SHA-1 fingerprints for the cluster of the Iowa file and the cluster of the New Hampshire file by adding the 1 SHA-1 fingerprint that identifies only a segment that is in the cluster of the Iowa file, the 1 SHA-1 fingerprint that identifies only a segment that is in the cluster of the New Hampshire file, and the 99 SHA-1 fingerprints that identify segments that are in the cluster of the Iowa file and segments that are in the cluster of the New Hampshire file. The optimized hierarchical clustering tool 126 can count the 101 unique SHA-1 fingerprints by sorting all 100 SHA-1 fingerprints for the cluster of the Iowa file, sorting all 100 SHA-1 fingerprints for the cluster of the New Hampshire file, and then comparing the individual SHA-1 fingerprints in the sorted list of 100 SHA-1 fingerprints for the cluster of the Iowa file against the individual fingerprints in the sorted list of 100 SHA-1 fingerprints for the cluster of the New Hampshire file. Unique fingerprints can be a collection of distinctive bit strings which were mapped from larger data objects or data files, and which distinctly identify the larger data objects or data files.

The fingerprints which are counted may be a sampled subset of all fingerprints corresponding to the files. For example, each of the 50 USA states data files 128 may be divided into 100,000 segments which are identified by 100,000 fingerprints, but the optimized hierarchical clustering tool 126 used a sampling rate of 1/1,000 to randomly sample 100 fingerprints for each of the 50 USA states data files 128 and more efficiently consume system resources by creating smaller arrays with fewer bits set to optimize the clustering of the 50 USA states data files 128. A sampled subset can be a portion drawn from a population, the use of which is intended to lead to statistical estimates of the attributes of the whole population.

The preceding descriptions of blocks 304 and 306 provide examples of a first option for counting common fingerprints and counting unique fingerprints. The first option is based on comparing the individual fingerprints for one cluster against the individual fingerprints of another cluster. The counting of common fingerprints and the counting of unique fingerprints which are included in FIG. 3A's blocks 304 and 306 are also included in FIG. 3B's blocks 308-322, which additionally include a second option for counting common fingerprints and counting unique fingerprints. The second option is based on counting the bits in the two clusters' arrays, with each bit representing an individual fingerprint's hashed value. As described below, and in the co-pending patent application that is incorporated by reference, the first option consumes greater amounts of system resources than consumed by the second option. After either option is used for counting common fingerprints and counting unique fingerprints, the method 300 continues to block 324 depicted by FIG. 3A.

A hash value may be generated by applying a hash function to a fingerprint of a segment in the cluster of the file and another hash value may be generated by applying the hash function to a fingerprint of another segment in the cluster of the file, block 308. The system can hash fingerprints for a cluster of a file. For example, and without limitation, this can include the optimized hierarchical clustering tool 126 hashing 100 fingerprints for 100 segments in the cluster of the Iowa file.

Having hashed values for a cluster of a file, a bit corresponding to the hash value and a bit corresponding to the other hash value may be set in an array corresponding to the cluster of the file, block 310. The system can initialize a Bloom filter for a cluster of a file. By way of example and without limitation, this can include the optimized hierarchical clustering tool 126 setting 100 bits in a Bloom filter, which correspond to the 100 hash values of the 100 fingerprints which identify 100 segments in the cluster of the Iowa file. A bit can be a binary digit. An array can be an indexed set of related elements.

In addition to initializing an array for a cluster of a file, an additional hash value may be generated by applying the same hash function to a fingerprint of a segment in a cluster of another file and an added hash value may be generated by applying the same hash function to a fingerprint of another segment in the cluster of the other file, block 312. The system can hash fingerprints for a cluster of another file. For example, and without limitation, this can include the optimized hierarchical clustering tool 126 hashing 100 fingerprints for 100 segments in the cluster of the New Hampshire file.

After hashing values for a cluster of another file, a bit corresponding to the additional hash value and a bit corresponding to the added hash value may be set in another array corresponding to the cluster of the other file, block 314. The system can initialize a Bloom filter for a cluster of another file. For example, and without limitation, this can include the optimized hierarchical clustering tool 126 setting 100 bits in a Bloom filter, which correspond to the 100 hash values of the 100 fingerprints which identify 100 segments in the cluster of the New Hampshire file.

Following initialization of an array and another array, total fingerprints may be counted by counting bits set in the array and bits set in the other array, block 316. The system can total the number of fingerprints for one cluster and the number of fingerprints for another cluster. By way of example and without limitation, this can include the optimized hierarchical clustering tool 126 adding the 100 bits in the array for the cluster of the Iowa file with the 100 bits in the array for the cluster of the New Hampshire file to total 200 bits as the maximum possible number of bits in a subsequently merged array. Total fingerprints can be the number of bit strings in two sets of bit strings which were mapped from larger data objects or data files, and which identify the larger data objects or data files.

In addition to counting bits set in each array, an array and another array may be merged into a merged array, block 318. The system can merge clusters' arrays into a merged array. In embodiments, this can include the optimized hierarchical clustering tool 126 merging the array for the cluster of the Iowa file with the array for the cluster of the New Hampshire file.

Having merged the arrays, unique fingerprints may be counted by counting bits set in the merged array, block 320. The system can use bits set in a merged array to efficiently count the unique fingerprints for corresponding clusters. For example, and without limitation, this can include the optimized hierarchical clustering tool 126 counting 101 bits set in the merged array, which equals the number of unique fingerprints for the cluster of the Iowa file and the cluster of the New Hampshire file. A merged array can be an indexed set of related elements created by combining indexed sets of related elements.

In addition to counting unique fingerprints, the count of unique fingerprints may be subtracted from the count of total fingerprints to count the common fingerprints, block 322. The system can use the merged array to efficiently count the common fingerprints for corresponding clusters. By way of example and without limitation, this can include the optimized hierarchical clustering tool 126 subtracting 101 unique fingerprints from 200 total fingerprints to determine a count of 99 common fingerprints for the cluster of the Iowa file and the cluster of the New Hampshire file.

After counting common and unique fingerprints, a distance between a cluster of a file and a cluster of another file is approximated, based on the count of common fingerprints and the count of unique fingerprints, block 324. The system approximates the distance between clusters. In embodiments, this can include the optimized hierarchical clustering tool 126 approximating a distance of 0.02 between the cluster of the Iowa file and the cluster of the New Hampshire file, based on the 101 unique SHA-1 fingerprints and the 99 common SHA-1 fingerprints for the cluster of the Iowa file and the cluster of the New Hampshire file. Approximating a distance may include dividing the count of common fingerprints by the count of unique fingerprints to estimate a similarity, and then subtracting the similarity from the value of one to approximate the distance. For example, the optimized hierarchical clustering tool 126 divides the 99 common SHA-1 fingerprints, which identify segments in the cluster of the Iowa file and segments in the cluster of the New Hampshire file, by the 101 unique SHA-1 fingerprints, which identify segments in the cluster of the Iowa file and/or segments in the cluster of the New Hampshire file, to estimate a similarity of 0.98 between the cluster of the Iowa file and the cluster of the New Hampshire file, then subtracts the similarity of 0.98 from the value of 1.00, which represents complete similarity, to approximate a dissimilarity or distance of 0.02 between the cluster of the Iowa file and the cluster of the New Hampshire file.

A distance can be a measured separation between entities. A count can be a total number of a collection of entities. A similarity can be how much files or clusters resemble each other. A value can be a numerical amount.

Following the approximation of distances between clusters, the smallest of distances, which are approximated between all clusters of the files, is identified, block 326. The system approximates the distances between all clusters and determines the smallest distance. For example, and without limitation, this can include the optimized hierarchical clustering tool 126 determining that the approximated distance of 0.02 between the cluster of the Iowa file and the cluster of the New Hampshire file is the smallest distance between the 50 clusters of the 50 USA states data files 128. The smallest of distances can be a shortest of measured separations between entities.

Having determined the smallest of distances between clusters, a cluster of a file and a cluster of another file are merged into a cluster of the file and the other file, in response to a determination that the approximated distance is the smallest of the distances, block 328. The system merges the closest clusters. By way of example and without limitation, this can include the optimized hierarchical clustering tool 126 merging the cluster of the Iowa file and the cluster of the New Hampshire file into a merged cluster of the Iowa file and the New Hampshire file, because the approximated distance of 0.02 between the cluster of the Iowa file and the cluster of the New Hampshire file is the smallest distance between the 50 clusters of the 50 USA states data files 128.

After a cluster of a file and a cluster of another file are merged into a newly merged cluster of the file and the other file, how distances will be approximated between every other cluster and the newly merged cluster of the file and the other file can be determined. For example, after merging the cluster of the Iowa file and the cluster of the New Hampshire file into the newly merged cluster of the Iowa file and the New Hampshire file, the optimized hierarchical clustering tool 126 can determine how distances will be approximated between the remaining 48 clusters of the 50 USA states data files 128 and the newly merged cluster of the Iowa file and the New Hampshire file. The distance between any additional cluster of any additional file and the newly merged cluster of the file and the other file may be the distance between the additional cluster of the additional file and the cluster of the file, the distance between the additional cluster of the additional file and the cluster of the other file, or the distance between the additional cluster of the additional file and an intermediate of the cluster of the file and the cluster of the other file. For example, the distance between the cluster of the Maine file and the newly merged cluster of the Iowa file and the New Hampshire file may be the minimum of possible distances, which is the distance of 0.04 between the cluster of the Maine file and the cluster of the Iowa file, In another example, the distance between the cluster of the Maine file and the newly merged cluster of the Iowa file and the New Hampshire file may be the maximum of possible distances, which is the distance of 0.06 between the cluster of the Maine file and the cluster of the New Hampshire file.

In yet another example, the distance between the cluster of the Maine file and the newly merged cluster of the Iowa file and the New Hampshire file may be an intermediate of the possible distances, which may be the distance of 0.05 between the cluster of the Maine file and an average, a mean, or a centroid of the cluster of the Iowa file and the cluster of the New Hampshire file. If an average, a mean, or a centroid of the cluster of the file and the other file is used to approximate distances for the newly merged cluster of the file and the other file, then the optimized hierarchical clustering tool 126 approximates these new distances between the newly merged cluster of the file and the other file, but the distances approximated between the remaining clusters of the files remains the same. For example, if an average, a mean, or a centroid of the cluster of the Iowa file and the New Hampshire file is used to approximate distances for the newly merged cluster of the Iowa file and the New Hampshire file, then the optimized hierarchical clustering tool 126 approximates these new distances for the newly merged cluster of the Iowa file and the New Hampshire file, but the distances approximated between the remaining 48 clusters of the 50 USA states data files 128 remains the same. An intermediate can be a position, location, or point between two entities.

After merging the closest clusters, an index is determined, corresponding to a smallest and a next smallest of the distances; block 330. The system computes an index based on the smallest and next smallest distances between clusters. In embodiments, this can include the optimized hierarchical clustering tool 126 calculating the $W_k$ index using the smallest distance of 0.02, between the cluster of the Iowa file and the cluster of the New Hampshire file, and the next smallest distance of 0.03, between the cluster of the New York file and the cluster of the Illinois file, to compute the $W_1$ index of 1.5, which is the distance of $D_2$=0.03 divided by the distance of $D_1$=0.02. An index can be a measure of comparing two entities. A next smallest of distances can be a second shortest of measured separations between entities.

Determining an index may include dividing the next smallest of the distances by the smallest of the distances or it may include subtracting the smallest of the distances from the next smallest of the distances. For example, if the $W_k$ index is defined as $D_{k+1}/D_k$, then $W_{46}=D_{47}$ (0.46)/$D_{46}$ (0.28)=1.6, $W_{47}=D_{48}$ (0.55)/$D_{47}$ (0.46)=1.2, and $W_{48}=D_{49}$ (0.97)/$D_{48}$ (0.55)=1.8. In another example, if the $W_k$ index is defined as $D_{k+1}-D_k$ then $W_{46}=D_{47}$ (0.46)−$D_{46}$ (0.28)=0.18, $W_{47}=D_{48}$ (0.55)−$D_{47}$ (0.46)=0.09, and $W_{48}=D_{49}$ (0.97)−$D_{48}$ (0.55)=0.42. In both examples the $W_k$ index is maximized as $W_{48}$.

Following the determination of one index for one merge of clusters, indexes which correspond to merges of all clusters of the files are determined, block 332. The system computes the indexes for merging all clusters. For example, and without limitation, this can include the optimized hierarchical clustering tool 126 determining the indexes $W_{46}=D_{47}$ (0.46)/$D_{46}$ (0.28)=1.6, $W_{47}=D_{48}$ (0.55)/$D_{47}$ (0.46)=1.2, and $W_{48}=D_{49}$ (0.97)/$D_{48}$ (0.55)=1.8.

Having determined all indexes, the maximum of the indexes is used to identify an optimal clustering of the files, block 328. The system uses the indexes to identify the optimal clustering of files. By way of example and without limitation, this can include the optimized hierarchical clustering tool 126 identifying the maximum index of $W_{48}$=1.8 based on the distance of $D_{49}$=0.97 between the South Dakota file and the Nevada file, and the distance of $D_{48}$=0.55 between the New Hampshire file and the Virginia file, which corresponds to the 48$^{th}$ iteration of the optimized hierarchical clustering of the 50 USA states data files 128, where there are 2 optimized clusters remaining (50 files−48 iterations=2 clusters). These 2 optimized clusters may be identified in the dendrogram 200 by visually drawing a horizontal line at the height=0.55, which represents a clustering distance threshold of $D_{48}$=0.55 for these 2 remaining clusters. An optimal clustering can be a most favorable grouping of files.

Although FIG. 3 depicts the blocks 302-334 occurring in a specific order, the blocks 302-334 may occur in another order. In other implementations, each of the blocks 302-334 may also be executed in combination with other blocks and/or some blocks may be divided into a different set of blocks.

Figure 4:
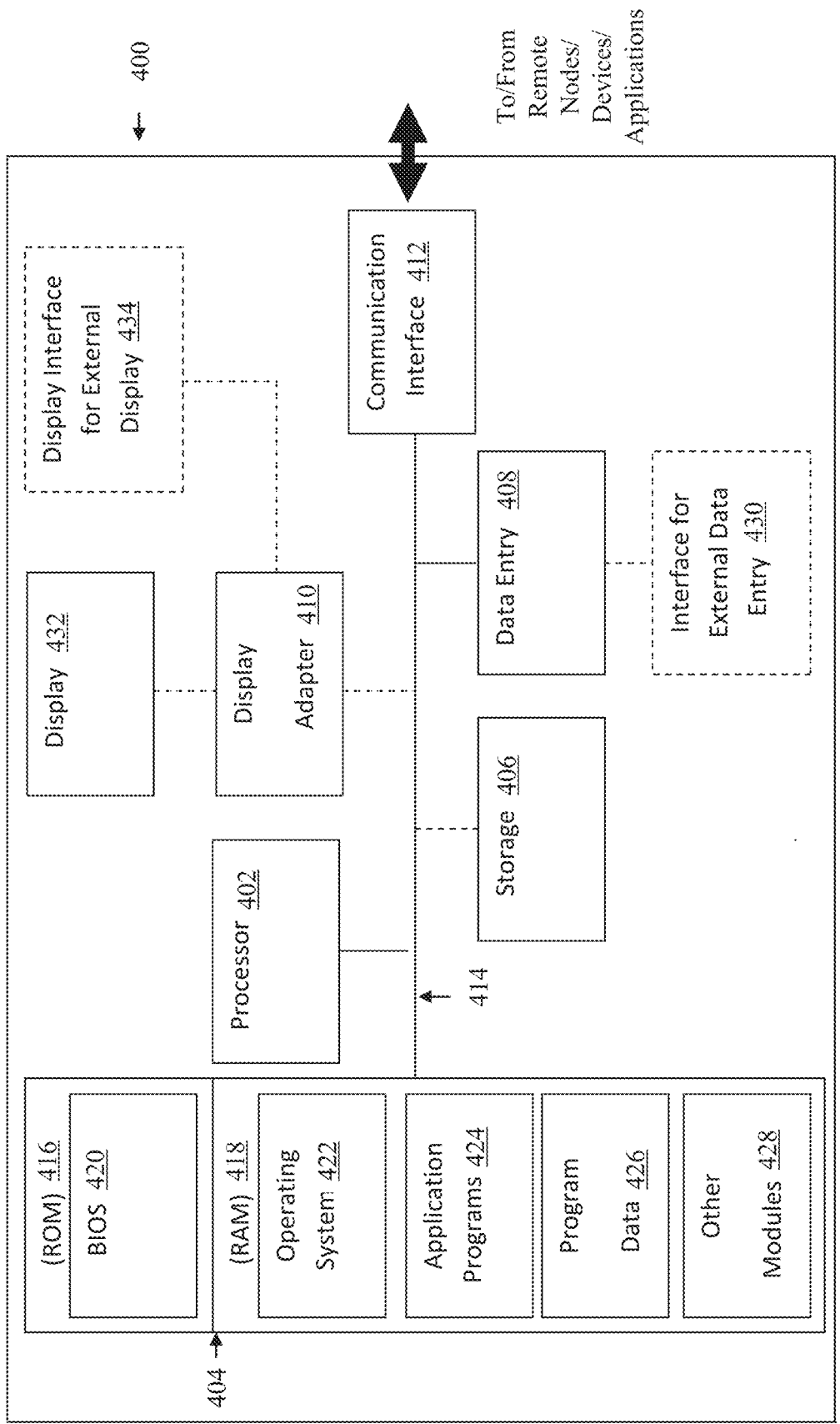
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random-access memory (RAM) 418. The memory 404 may be configured to store program instructions and data during operation of the hardware device 400. In various embodiments, the memory 404 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic formats, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

Program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430.

By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device, or other common network node, and typically includes many or all the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

The arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for optimized hierarchical clustering of files, comprising:
   one or more processors; and
   a non-transitory computer readable medium storing a plurality of instructions, which when executed, cause the one or more processors to:
   partition files, comprising segments identified by fingerprints into corresponding clusters;
   generate hash values by applying a hash function to the fingerprints of the segments in the clusters of the file;
   count common fingerprints by counting fingerprints which correspond to both a cluster of a file and a cluster of another file;
   count unique fingerprints by counting fingerprints which correspond to at least one of the cluster of the file and the cluster of the other file;
   approximate a distance, based on the count of common fingerprints and the count of unique fingerprints, between the cluster of the file and the cluster of the other file;
   identify a smallest of distances which are approximated between all clusters of the files;
   merge the cluster of the file and the cluster of the other file into a cluster of the file and the other file, in response to a determination that the approximated distance is the smallest of the distances;
   determine a distance index number for the merged cluster by one of dividing a next smallest of distances between all the clusters of the files by a smallest of the distances between all the clusters of the files or subtracting the smallest of distances between all the clusters of the files from the next smallest of the distances between all the clusters of the files;
   determine distance index numbers for merges of all clusters of the files using a smallest and a next smallest of the distances between the clusters of the files that have not been merged after the determination of the distance index number of the merged cluster; and
   identify, based on a maximum of the distance index numbers, a corresponding maximum clustering distance threshold as an optimal clustering of the files.

2. The system of claim 1, wherein each fingerprint is generated as a hash value by applying a hash function to a corresponding segment.

3. The system of claim 1, wherein the fingerprints which are counted comprise a sampled subset of all fingerprints corresponding to the files.

4. The system of claim 1, wherein counting common fingerprints and counting unique fingerprints comprise:
   generating a hash value by applying a hash function to a fingerprint of a segment in the cluster of the file and an other hash value by applying the hash function to a fingerprint of an other segment in the cluster of the file;
   setting a bit corresponding to the hash value and a bit corresponding to the other hash value in an array corresponding to the cluster of the file;
   generating an additional hash value by applying the hash function to a fingerprint of a segment in the cluster of the other file and an added hash value by applying the hash function to a fingerprint of an other segment in the cluster of the other file;
   setting a bit corresponding to the additional hash value and a bit corresponding to the added hash value in an other array corresponding to the cluster of the other file;
   counting total fingerprints by counting bits set in the array and bits set in the other array;
   merging the array and the other array into a merged array;
   counting the unique fingerprints by counting bits set in the merged array; and
   subtracting the count of unique fingerprints from the count of total fingerprint to count the common fingerprints.

5. The system of claim 1, wherein approximating the distance comprises dividing the count of common fingerprints by the count of unique fingerprints to estimate a similarity, and then subtracting the similarity from a value of one to approximate the distance.

6. The system of claim 1, wherein a distance between a cluster of an additional file and the cluster of the file and the other file comprises one of a distance between the cluster of the additional file and the cluster of the file, a distance between the cluster of the additional file and the cluster of the other file, and a distance between the cluster of the additional file and an intermediate of the cluster of the file and the cluster of the other file.

7. A computer-implemented method for optimized hierarchical clustering of files, the computer-implemented method comprising:
   partitioning files, comprising segments identified by fingerprints into corresponding clusters;
   generating hash values by applying a hash function to the fingerprints of the segments in the clusters of the file;
   counting common fingerprints by counting fingerprints which correspond to both a cluster of a file and a cluster of another file;
   counting unique fingerprints by counting fingerprints which correspond to at least one of the cluster of the file and the cluster of the other file;
   approximating a distance, based on the count of common fingerprints and the count of unique fingerprints, between the cluster of the file and the cluster of the other file;
   identifying a smallest of distances which are approximated between all clusters of the files;
   merging the cluster of the file and the cluster of the other file into a cluster of the file and the other file, in response to a determination that the approximated distance is the smallest of the distances;
   determining a distance index number for the merged cluster by one of dividing a next smallest of distances between all the clusters of the files by a smallest of the distances between all the clusters of the files or subtracting the smallest of distances between all the clusters of the files from the next smallest of the distances between all the clusters of the files;
   determining distance index numbers for merges of all clusters of the files using a smallest and a next smallest of the distances between the clusters of the files that have not been merged after the determination of the distance index number of the merged cluster; and identifying, based on a maximum of the distance index numbers, a corresponding maximum clustering distance threshold as an optimal clustering of the files.

8. The computer-implemented method of claim 7, wherein each fingerprint is generated as a hash value by applying a hash function to a corresponding segment.

9. The computer-implemented method of claim 7, wherein the fingerprints which are counted comprise a sampled subset of all fingerprints corresponding to the files.

10. The computer-implemented method of claim 7, wherein counting common fingerprints and counting unique fingerprints comprise:

generating a hash value by applying a hash function to a fingerprint of a segment in the cluster of the file and an other hash value by applying the hash function to a fingerprint of an other segment in the cluster of the file;

setting a bit corresponding to the hash value and a bit corresponding to the other hash value in an array corresponding to the cluster of the file;

generating an additional hash value by applying the hash function to a fingerprint of a segment in the cluster of the other file and an added hash value by applying the hash function to a fingerprint of an other segment in the cluster of the other file;

setting a bit corresponding to the additional hash value and a bit corresponding to the added hash value in an other array corresponding to the cluster of the other file;

counting total fingerprints by counting bits set in the array and bits set in the other array;

merging the array and the other array into a merged array;

counting the unique fingerprints by counting bits set in the merged array; and subtracting the count of unique fingerprints from the count of total fingerprint to count the common fingerprints.

11. The computer-implemented method of claim 7, wherein approximating the distance comprises dividing the count of common fingerprints by the count of unique fingerprints to estimate a similarity, and then subtracting the similarity from a value of one to approximate the distance.

12. The computer-implemented method of claim 7, wherein a distance between a cluster of an additional file and the cluster of the file and the other file comprises one of a distance between the cluster of the additional file and the cluster of the file, a distance between the cluster of the additional file and the cluster of the other file, and a distance between the cluster of the additional file and an intermediate of the cluster of the file and the cluster of the other file.

13. A computer program product, comprising a non-transitory computer-readable medium having a computer-readable program code embodied therein to be executed by one or more processors, the program code including instructions to:

partition files, comprising segments identified by fingerprints into corresponding clusters;

generate hash values by applying a hash function to the fingerprints of the segments in the clusters of the file;

count common fingerprints by counting fingerprints which correspond to both a cluster of a file and a cluster of another file;

count unique fingerprints by counting fingerprints which correspond to at least one of the cluster of the file and the cluster of the other file;

approximate a distance, based on the count of common fingerprints and the count of unique fingerprints, between the cluster of the file and the cluster of the other file;

identify a smallest of distances which are approximated between all clusters of the files;

merge the cluster of the file and the cluster of the other file into a cluster of the file and the other file, in response to a determination that the approximated distance is the smallest of the distances;

determine a distance index number for the merged cluster by one of dividing a next smallest of distances between all the clusters of the files by a smallest of the distances between all the clusters of the files or subtracting the smallest of distances between all the clusters of the files from the next smallest of the distances between all the clusters of the files;

determine distance index numbers for merges of all clusters of the files using a smallest and a next smallest of the distances between the clusters of the files that have not been merged after the determination of the distance index number of the merged cluster; and identify, based on a maximum of the distance index numbers, a corresponding maximum clustering distance threshold as an optimal clustering of the files.

14. The computer program product of claim 13, wherein each fingerprint is generated as a hash value by applying a hash function to a corresponding segment.

15. The computer program product of claim 13, wherein the fingerprints which are counted comprise a sampled subset of all fingerprints corresponding to the files.

16. The computer program product of claim 13, wherein counting common fingerprints and counting unique fingerprints comprise:

generating a hash value by applying a hash function to a fingerprint of a segment in the cluster of the file and an other hash value by applying the hash function to a fingerprint of an other segment in the cluster of the file;

setting a bit corresponding to the hash value and a bit corresponding to the other hash value in an array corresponding to the cluster of the file;

generating an additional hash value by applying the hash function to a fingerprint of a segment in the cluster of the other file and an added hash value by applying the hash function to a fingerprint of an other segment in the cluster of the other file;

setting a bit corresponding to the additional hash value and a bit corresponding to the added hash value in an other array corresponding to the cluster of the other file;

counting total fingerprints by counting bits set in the array and bits set in the other array;

merging the array and the other array into a merged array;

counting the unique fingerprints by counting bits set in the merged array; and subtracting the count of unique fingerprints from the count of total fingerprint to count the common fingerprints.

17. The computer program product of claim 13, wherein approximating the distance comprises dividing the count of common fingerprints by the count of unique fingerprints to estimate a similarity, and then subtracting the similarity from a value of one to approximate the distance.

18. The computer program product of claim 13, wherein a distance between a cluster of an additional file and the cluster of the file and the other file comprises one of a distance between the cluster of the additional file and the cluster of the file, a distance between the cluster of the additional file and the cluster of the other file, and a distance between the cluster of the additional file and an intermediate of the cluster of the file and the cluster of the other file.

* * * * *